United States Patent [19]

Nordenstrom

[11] Patent Number: 5,668,868
[45] Date of Patent: Sep. 16, 1997

[54] MEMORANDUM RECORDER FOR USE WITH A TELEPHONE

[76] Inventor: Tina L. Nordenstrom, 40800 Breezy Pass Rd. #C, Palm Desert, Calif. 92211

[21] Appl. No.: 628,986

[22] Filed: Apr. 8, 1996

[51] Int. Cl.$^6$ ......................................... H04M 1/00
[52] U.S. Cl. ........................... 379/447; 379/88; 379/449
[58] Field of Search ........................... 379/88, 67, 450, 379/447, 449; 455/90, 89, 128

[56] References Cited

U.S. PATENT DOCUMENTS 4,481,382  11/1984  Villa-Real .................................. 379/85
4,797,916  1/1989  Kojima ..................................... 379/447
5,568,538  10/1996  Tamir et al. .............................. 379/88

Primary Examiner—Fan Tsang

[57] ABSTRACT

A memorandum recorder for use with a telephone including a speaker adapted to emit audio signals therefrom. Also included is a memory device for storing audio signals thereon. Finally, a control mechanism is connected to a conventional telephone and is adapted to allow conventional communication via the telephone in a first mode of operation, to allow storage of audio signals inputed from a mouthpiece of the telephone in a second mode of operation upon the depression of a record button, and to allow playback of stored audio signals via the speaker in a third mode of operation upon the depression of a playback button.

1 Claim, 4 Drawing Sheets

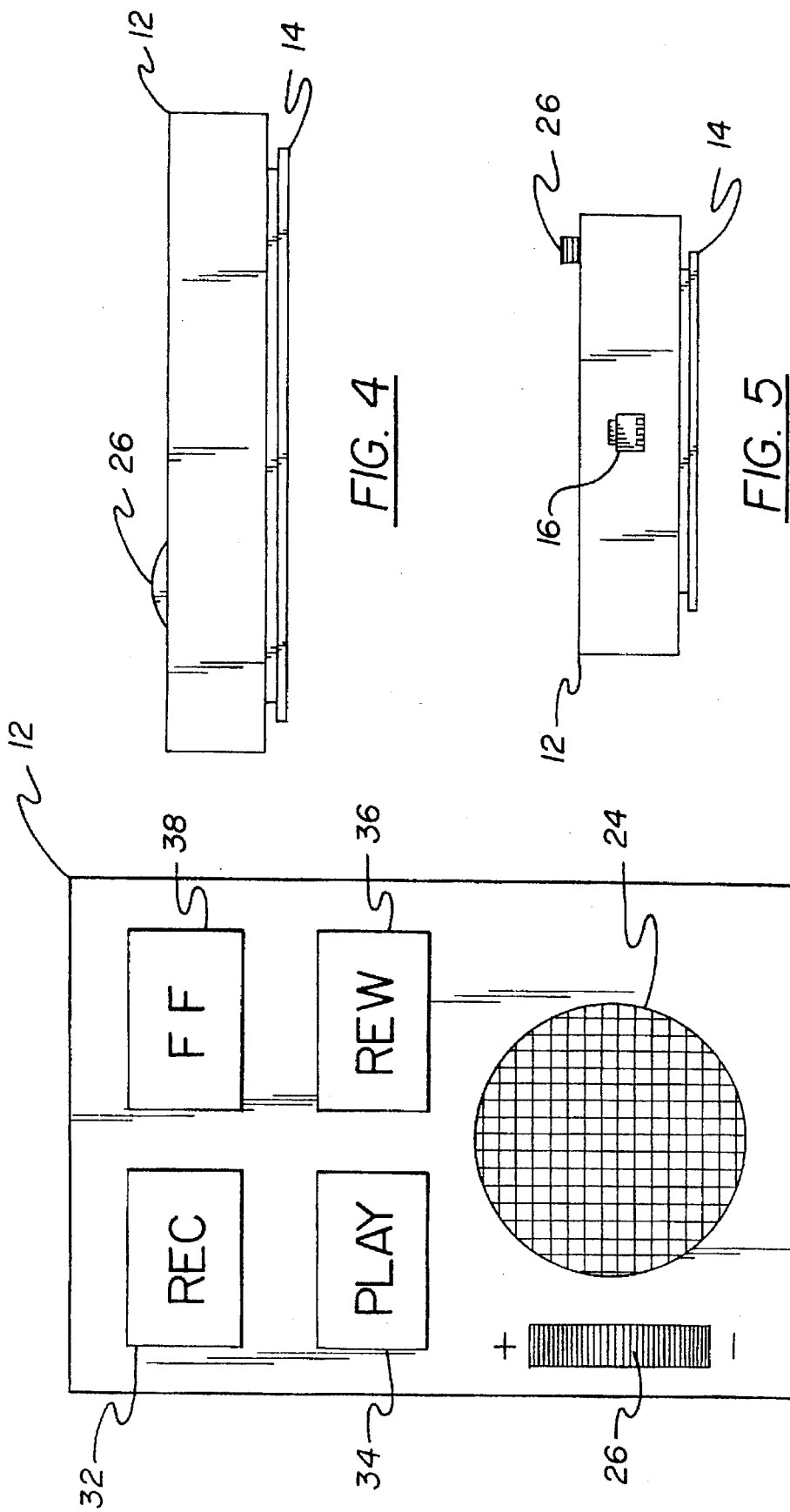

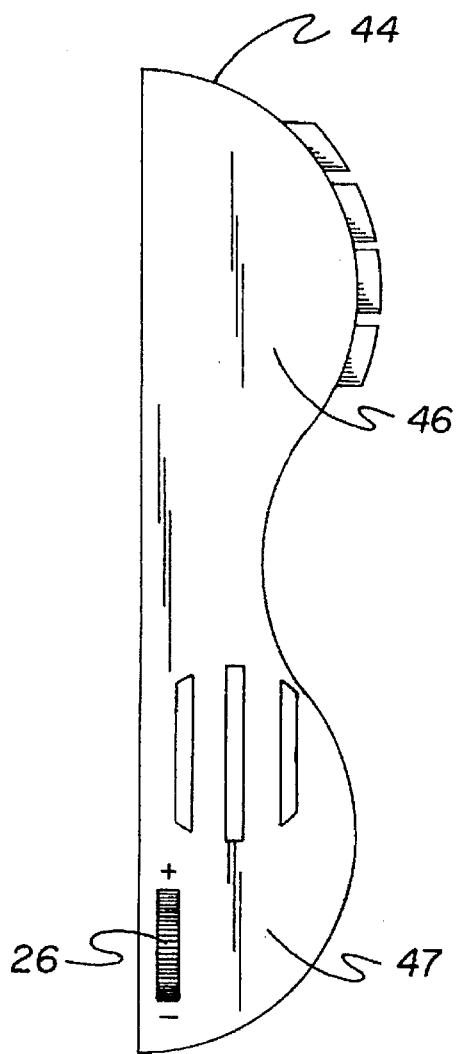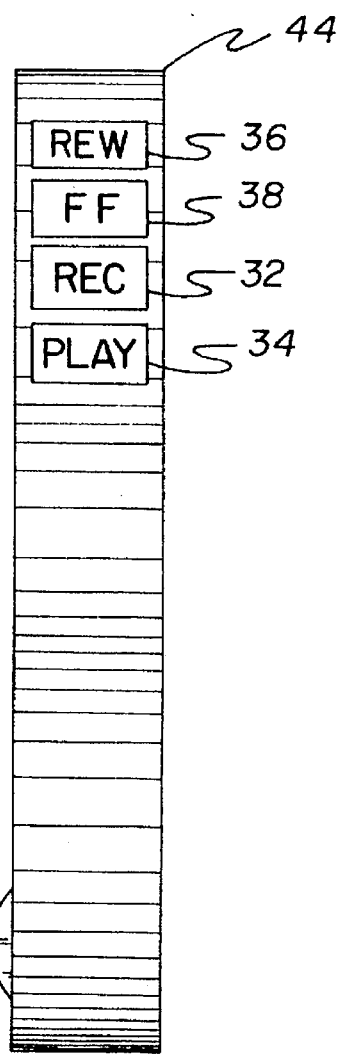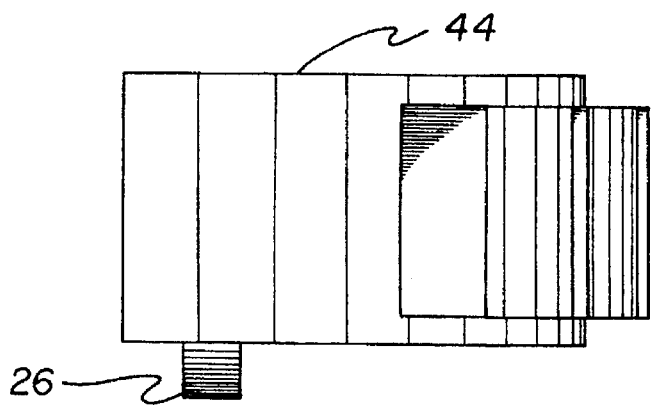
FIG. 6          FIG. 7
FIG. 8

MEMORANDUM RECORDER FOR USE WITH A TELEPHONE

BACKGROUND OF THE INVENTION

1. Field of the Invention

The present invention relates to a memorandum recorder for use with a telephone and more particularly pertains to recording memos, phone numbers, messages, and the like while simultaneously using a phone.

2. Description of the Prior Art

The use of recording devices is known in the prior art. More specifically, recording devices heretofore devised and utilized for the purpose of storing important information are known to consist basically of familiar, expected and obvious structural configurations, notwithstanding the myriad of designs encompassed by the crowded prior art which have been developed for the fulfillment of countless objectives and requirements.

By way of example, the prior art discloses in U.S. Pat. No. 5,348,347 to Shink; U.S. Pat. No. 5,315,636 to Patel; U.S. Pat. Des. 351,854 to Takahata; U.S. Pat. No. 5,203,009 to Bogusz et al.; and U.S. Pat. Des. 310,543 to Brown are provided as being of general interest.

In this respect, the memorandum recorder for use with a telephone according to the present invention substantially departs from the conventional concepts and designs of the prior art, and in so doing provides an apparatus primarily developed for the purpose of recording memos, phone numbers, messages, and the like while simultaneously using a phone.

Therefore, it can be appreciated that there exists a continuing need for a new and improved memorandum recorder for use with a telephone which can be used for recording memos, phone numbers, messages, and the like while simultaneously using a phone. In this regard, the present invention substantially fulfills this need.

SUMMARY OF THE INVENTION

In view of the foregoing disadvantages inherent in the known types of recording devices now present in the prior art, the present invention provides an improved memorandum recorder for use with a telephone. As such, the general purpose of the present invention, which will be described subsequently in greater detail, is to provide a new and improved memorandum recorder for use with a telephone apparatus and method which has all the advantages of the prior art and none of the disadvantages.

To attain this, the present invention essentially comprises a housing with a front surface, a rear surface, a top face, a bottom face, and a pair of side edges formed therebetween defining an interior space. The housing also has a pair of elongated parallel strips formed on the rear face thereof. An input jack is situated on the top face of the housing for accepting a communication line coupled to a telephone. An output jack is situated on the bottom face of the housing for accepting a communication line coupled to a telecommunication mechanism. Such telecommunication mechanism may either be comprised of a conventional phone line or a cellular unit. Also included is a speaker positioned on the front face thereof with an associated volume control dial. Such dial may be manipulated in order to adjust the volume of audio signals emitted from the speaker. A compact memory device comprising of either an EPROM or a mini-cassette is situated within the interior space of the housing. The memory device is adapted to store audio signals thereon. A control mechanism is situated within the interior space and is further coupled to the input jack, output jack, speaker, and memory device. The control mechanism is adapted to allow conventional communication between the input jack and output jack in a first mode of operation thereby allowing normal use of the telephone and telecommunication mechanism. In a second mode of operation, the control mechanism is adapted to allow the storage of audio signals inputed from a mouthpiece of the telephone via the input jack upon the depression of a record button. Lastly, playback of the stored audio signals may be afforded via the speaker in a third mode of operation upon the depression of a playback button. Also included are a rewind button and a forward button for allowing a user to selectively control the playback of the audio signals. Finally, a planar mounting unit has an adhesive lining a rear surface thereof for allowing the securement thereof to a convenient recipient surface. A pair of elongated parallel flanges are situated on a top surface thereof for releasably receiving the strips of the recorder unit housing.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved memorandum recorder for use with a telephone which has all the advantages of the prior art recording devices and none of the disadvantages.

It is another object of the present invention to provide a new and improved memorandum recorder for use with a telephone which may be easily and efficiently manufactured and marketed.

It is a further object of the present invention to provide a new and improved memorandum recorder for use with a telephone which is of a durable and reliable construction.

An even further object of the present invention is to provide a new and improved memorandum recorder for use with a telephone which is susceptible of a low cost of manufacture with regard to both materials and labor, and which accordingly is then susceptible of low prices of sale to the consuming public, thereby making such memorandum recorder for use with a telephone economically available to the buying public.

Still yet another object of the present invention is to provide a new and improved memorandum recorder for use with a telephone which provides in the apparatuses and methods of the prior art some of the advantages thereof, while-simultaneously overcoming some of the disadvantages normally associated therewith.

Still another object of the present invention is to record memos, phone numbers, messages, and the like while simultaneously using a phone.

Lastly, it is an object of the present invention to provide a new and improved memorandum recorder for use with a telephone including a speaker adapted to emit audio signals therefrom. Also included is a memory device for storing audio signals thereon. Finally, a control mechanism is connected to a conventional telephone and is adapted to allow conventional communication via the telephone in a first mode of operation, to allow storage of audio signals inputed from a mouthpiece of the telephone in a second mode of operation upon the depression of a record button, and to allow playback of stored audio signals via the speaker in a third mode of operation upon the depression of a playback button.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a front plan view of the recorder unit of the present invention.

FIG. 4 is a side plan view of the recorder unit depicted in FIG. 3.

FIG. 5 is a top view of the recorder unit and the associated input jack thereof.

FIG. 6 is a front plan view of the alternate embodiment.

FIG. 7 is a side plan view of the alternate embodiment.

FIG. 8 is a top plan view of the alternate embodiment.

Similar reference characters refer to similar parts throughout the several views of the drawings.

DESCRIPTION OF THE PREFERRED EMBODIMENT

Figure 1:
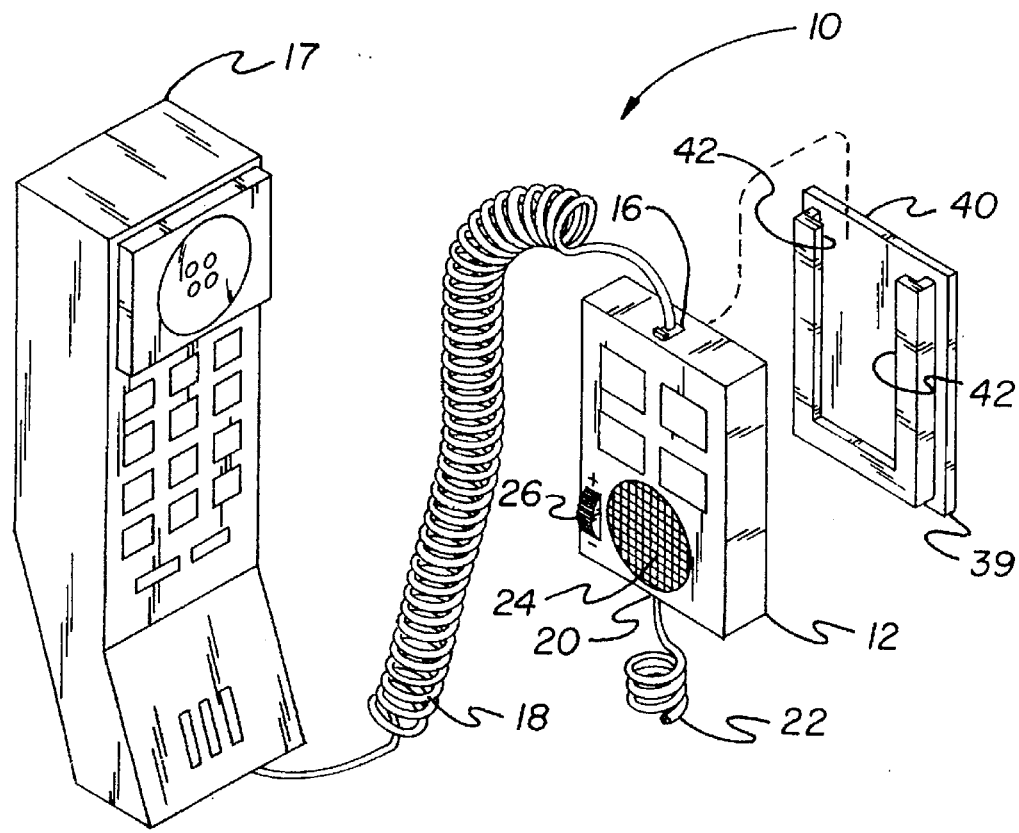
FIG. 1 is a perspective illustration of the preferred embodiment of the memorandum recorder for use with a telephone constructed in accordance with the principles of the present invention.

With reference now to the drawings, and in particular to FIG. 1 thereof, a new and improved memorandum recorder for use with a telephone embodying the principles and concepts of the present invention and generally designated by the reference numeral 10 will be described.

The present invention, the new and improved memorandum recorder for use with a telephone, is comprised of a plurality of components. Such components in their broadest context include a housing, input jack, output jack, speaker, memory, control mechanism, and mount. Such components are individually configured and correlated with respect to each other so as to attain the desired objective.

More specifically, it will be noted that the system 10 of the present invention includes a recorder unit. Such recorder unit comprises a housing 12 with a front surface, a rear surface, a top face, a bottom face, and a pair of side edges formed therebetween defining an interior space. The housing also has a pair of elongated parallel strips 14 formed on the rear face thereof. Ideally, the recorder unit housing is constructed of an impact resistant plastic or the like.

An input jack 16 is situated on the top face of the housing for accepting a communication line coupled to a telephone 17. A retractable cord 18 is employed to facilitate such coupling.

An output jack 20 is situated on the bottom face of the housing for accepting a communication line 22 coupled to a telecommunication mechanism 23. Such telecommunication mechanism may either be comprised of a conventional phone line or a cellular transceiver unit.

Also included is a speaker 24 positioned on the front face of the housing with an associated volume control dial 26. The volume control dial may be manipulated in order to adjust the volume of audio signals emitted from the speaker.

A compact memory device 28 comprising of either an EPROM or a mini-cassette is situated within the interior space of the housing. The memory device is adapted to store audio signals thereon. Either of the two types of memory may be employed to best suit the size and recording length requirements of the present invention.

A control mechanism 29 is situated within the interior space and is further coupled to the input jack, output jack, speaker, memory device, and a plurality of keys 30. The control mechanism is adapted to allow conventional communication between the input jack and output jack in a first mode of operation thereby allowing normal use of the telephone and telecommunication mechanism. In a second mode of operation, the control mechanism is adapted to allow storage of audio signals inputed from a mouthpiece of the telephone via the input jack upon the depression of a record button 32. Lastly, playback of the stored audio signals may be afforded via the speaker in a third mode of operation upon the depression of a playback button 34. Alternatively, an earpiece of the telephone may be employed to effect playback. Also included are a rewind button 36 and a forward button 38 for allowing a user to selectively control the playback of the audio signals. As an additional option, the control mechanism may also be adapted to record audio information received via the telecommunication mechanism.

Finally, a planar mounting unit 39 has an adhesive 40 lining a rear surface thereof for allowing the securement thereof to a convenient recipient surface. A pair of elongated parallel flanges 42 are situated on a top surface thereof for releasably receiving the strips of the recorder unit housing. The mounting unit thus provides a means of positioning the recorder unit within reach.

Figure 2:
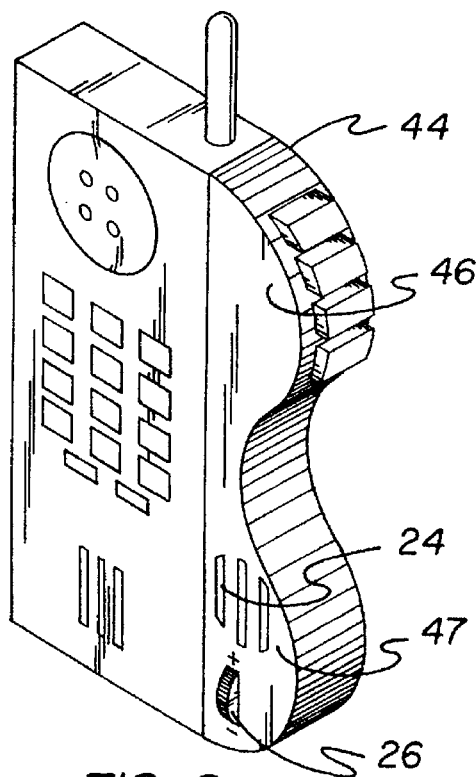
FIG. 2 is a perspective view of the alternate embodiment of the present invention.
Figure 9:
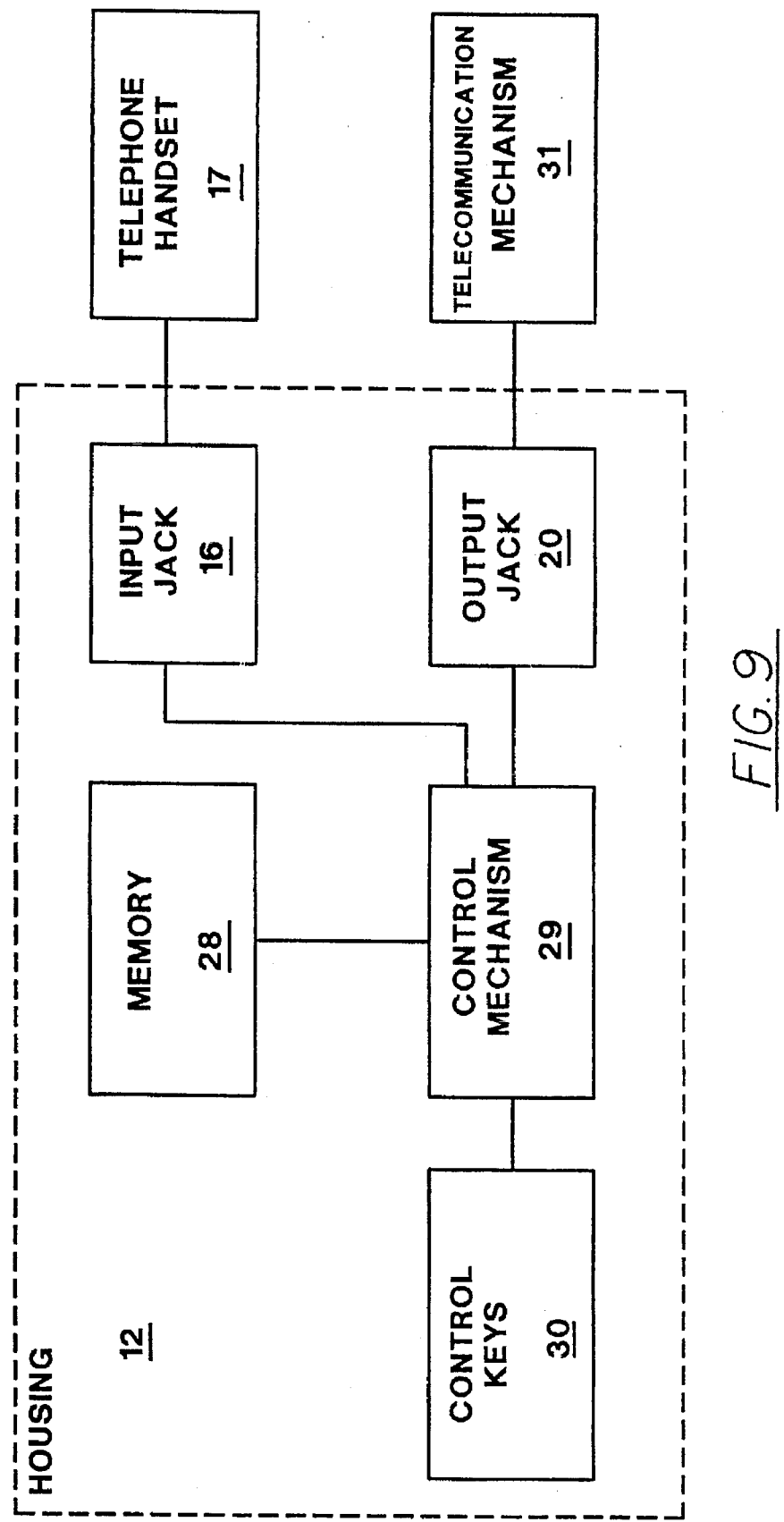
FIG. 9 is a schematic depicting the circuitry employed in the present invention.

An alternative embodiment, as shown in FIG. 2, operates in a manner similar to that of the foregoing embodiment except, in lieu of the output jack and input jack, all connections with the telephone and telecommunication mechanism are made internally. Also, a specially designed housing 44 is included with an upper semicircular portion 46 having an arcuate edge and a planar edge and a lower semicircular portion 47 having an arcuate edge and a planar edge conterminous with the planar edge of the upper section. The planar edge of both the upper portion and lower portion have a depth similar to that of a conventional cellular phone and are adapted to be coupled thereto. The arcuate edge of the upper portion and lower portion form a valley therebetween at a central extent of the housing for allowing comfortable handling by a user. In the present embodiment, all of the buttons including the playback button and record button are linearly aligned on the arcuate edge of the upper portion for easy manipulation. Finally, the speaker is situated on a top surface of the lower portion.

In use, the memorandum recorder allows normal operation of the phone regardless of in which mode of operation the unit is being currently employed. The present invention also affords the recording of verbal information via the mouthpiece of the telephone whether or not the telephone is currently employed for conventional communication. Such independent operation affords a wide range of versatility in that the user may record or receive information while speaking to another party. Also, the user may dial a number while simultaneously receiving it from the memorandum recorder.

As such, the present invention offers a unique method of storing verbal information pertinent to the use of an associated telephone. The invention is ideal for recording memos, phone numbers, messages, and the like while simultaneously using the phone.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved memorandum recorder for use with a telephone comprising, in combination:

a recorder unit including:

a housing with an upper semicircular portion having an arcuate edge and a planar edge and a lower semicircular portion having an arcuate edge and a planar edge continuous with the planar edge of the upper section whereby the arcuate edge of the upper portion and the arcuate edge of the lower portion form a valley therebetween at a central extent of the housing, a total length of the combination of the upper planar edge and the lower planar edge being a length of the telephone and adapted to be coupled thereto;

an input jack for accepting a communication line coupled to the telephone, an output jack for accepting a communication line coupled to a telecommunication means, a speaker with an associated volume control means for adjusting the volume of audio signals emitted therefrom, memory means comprising an EPROM situated within an interior space of the housing and adapted to store audio signals thereon, and control means situated within the interior space of the housing and coupled to the input jack, output jack, speaker, and memory means, the control means adapted to allow communication between the input jack and output jack in a first mode of operation thereby allowing use of the telephone and telecommunication means, to allow storage of audio signals from a mouthpiece of the telephone via the input jack in a second mode of operation upon the depression of a record button, and to allow playback of stored audio signals via the speaker in a third mode of operation upon the depression of a playback button whereby a user may selectively control the playback of the audio signals by depressing a rewind button and a forward button;

said control means further adapted to record audio information received via the telecommunication means;

said control means also adapted to allowing operation of the telephone regardless in which mode of operation the control means is being employed;

said playback button and record button being situated on the arcuate edge of the upper portion of the housing;

said speaker means being situated on a top surface of the lower portion of the housing.

\* \* \* \* \*